US012652644B2

(12) United States Patent
Wang et al.

(10) Patent No.: US 12,652,644 B2
(45) Date of Patent: Jun. 9, 2026

(54) CELLULAR API FOR SATELLITE CONFIGURATIONS

(71) Applicant: GOOGLE LLC, Mountain View, CA (US)

(72) Inventors: Jibing Wang, San Jose, CA (US); Aamir Akram, San Jose, CA (US); Erik Richard Stauffer, Sunnyvale, CA (US); Sharath Ananth, Cupertino, CA (US)

(73) Assignee: GOOGLE LLC, Mountain View, CA (US)

( * ) Notice: Subject to any disclaimer, the term of this patent is extended or adjusted under 35 U.S.C. 154(b) by 234 days.

(21) Appl. No.: 18/281,873

(22) PCT Filed: Mar. 9, 2022

(86) PCT No.: PCT/US2022/019483
§ 371 (c)(1),
(2) Date: Sep. 13, 2023

(87) PCT Pub. No.: WO2022/250756
PCT Pub. Date: Dec. 1, 2022

(65) Prior Publication Data
US 2024/0188031 A1 Jun. 6, 2024

Related U.S. Application Data

(60) Provisional application No. 63/161,123, filed on Mar. 15, 2021.

(51) Int. Cl.
| | | |
|---|---|---|
| *H04W 76/15* | (2018.01) | |
| *H04W 64/00* | (2009.01) | |
| *H04W 84/06* | (2009.01) | |

(52) U.S. Cl.
CPC ......... *H04W 64/006* (2013.01); *H04W 76/15* (2018.02); *H04W 84/06* (2013.01)

(58) Field of Classification Search
CPC H04B 7/18513; H04B 7/18545; H04W 84/06
(Continued)

(56) References Cited

U.S. PATENT DOCUMENTS 8,538,682 B1 9/2013 Vankatraman et al.
2008/0180320 A1* 7/2008 Tysowski .............. G01S 19/258
342/357.43
(Continued)

FOREIGN PATENT DOCUMENTS

WO WO-2013093564 A1 * 6/2013 ............. G01S 19/05
WO WO-2017189862 A1 * 11/2017 ......... H04B 7/18541

OTHER PUBLICATIONS

Translation of Japanese Notice of Reasons for Refusal mailed Jan. 10, 2025 for JP Application No. 2023-556835, 5 pages.
(Continued)

*Primary Examiner* — Jirapon Tulop

(57) ABSTRACT

A UE receives satellite ephemeris information from a server and calculates one or more satellite parameters for at least one satellite based on the satellite ephemeris information. The UE controls, based on the one or more satellite parameters, operation of a software application that utilizes a data service provided via the at least one satellite. Calculating satellite parameters can include calculating one or more satellite parameters at an API of the UE, and controlling operation of a software application can include receiving, at the API, a request for satellite ephemeris information from the software application, providing, by the API, a representation of the one or more satellite parameters to the software application in response to the request, and adjusting, at the software application, an operation of the software applica-
(Continued)

tion based on the received representation of the one or more satellite parameters.

23 Claims, 4 Drawing Sheets

(58) Field of Classification Search
USPC ......................................................... 455/418
See application file for complete search history.

(56) References Cited

U.S. PATENT DOCUMENTS

| | | |
|---|---|---|
| 2015/0270890 A1 | 9/2015 | Vasavada et al. |
| 2019/0041526 A1 | 2/2019 | Lucky et al. |
| 2019/0058522 A1 | 2/2019 | Haley et al. |
| 2019/0319868 A1 | 10/2019 | Svennebring et al. |
| 2020/0367067 A1 | 11/2020 | Haley et al. |
| 2022/0064688 A1 | 3/2022 | Blake et al. |

OTHER PUBLICATIONS

International Search Report and Written Opinion mailed Jan. 13, 2023 for PCT Application No. PCT/US2022/019483, 14 pages.
NPL—5G Americas, "Wireless Technology Evolution Transition from 4G to 5G," 3GPP Releases 14 to 16; 5G Americas Whitepaper; Oct. 2018; p. 170.
Thales Alenia Space (TAS), "Satellite and Terrestrial Network for 5G: D3.4—Satellite and 3GPP NextGen Reference Interface," Aug. 2018, 114 pages.
International Preliminary Report on Patentability mailed Sep. 28, 2023 for PCT Application No. PCT/US2022/019483, 9 pages.
Translation of Korean Notice of Allowance mailed Jul. 29, 2025 for KR Application No. 10-2023-7034790 4 pages.

* cited by examiner

SERVER 116

302

303

UE 110

CELLULAR API FOR SATELLITE CONFIGURATIONS

CROSS-REFERENCE TO RELATED APPLICATIONS

The present application is a U.S. National Stage under 35 U.S.C. § 371 of International Patent Application Serial No. PCT/US2022/019483, entitled "CELLULAR API FOR SATELLITE CONFIGURATIONS" and filed on Mar. 9, 2022, which claims priority to U.S. Provisional Application No. 63/161,123, entitled "CELLULAR API FOR SATELLITE CONFIGURATIONS" and filed on Mar. 15, 2021, the entireties of which are incorporated by reference herein.

BACKGROUND

Wireless communication systems often employ various techniques to facilitate communication between mobile user equipment (UE) and associated base stations. These techniques often benefit from the fact that the base stations typically are stationary. However, with the development of satellite-based communications with UEs, the mobility of the satellites introduces additional complexity to the efforts to provide adequate coverage, latency, throughput, and reliability in the communications between a UE and the one or more satellites providing communications services to the UE.

BRIEF DESCRIPTION OF THE DRAWINGS

The present disclosure is better understood, and its numerous features and advantages made apparent to those skilled in the art, by referencing the accompanying drawings. The use of the same reference symbols in different drawings indicates similar or identical items.

DETAILED DESCRIPTION

Figure 1:
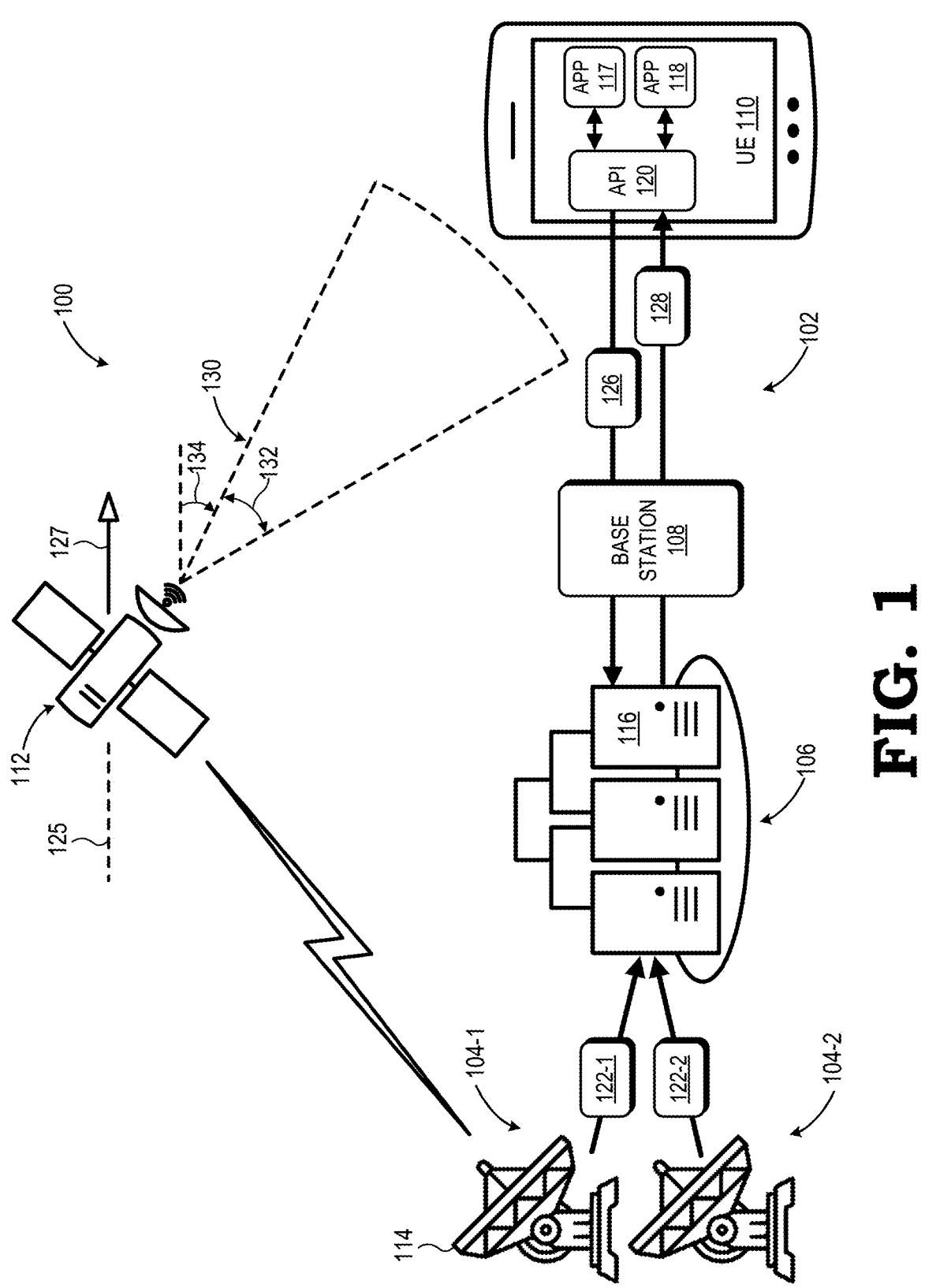
FIG. 1 is a block diagram of a satellite-based wireless communications system employing an application programming interface (API) for providing satellite ephemera in accordance with some embodiments.

With the development of satellite communications suitable for employment for cellular-enabled user equipment (UE), such UEs can take advantage of satellite-supported data services in addition to traditional terrestrial cellular data services, including those supported by cellular networks employing communication techniques based on Third Generation Partnership Project (3GPP) Fourth Generation (4G) Long Term Evolution (LTE) and Fifth Generation (5G) New Radio (NR) standards. However, unlike most base stations employed in terrestrial wireless networks, the satellites provided by various satellite carriers are in constant motion, and thus a UE cannot readily identify the current position of a given satellite without prior knowledge of certain ephemera (e.g., altitude and velocity) for the given satellite. This uncertainty in position, as well as in certain other satellite status information, such as active beams deployed, transmit power, and the like, can make it difficult for a UE to establish an initial connection with a satellite. Moreover, in the absence of a mechanism for the satellite to continue to update the UE on its various operational parameters, it can be difficult for the UE to manage an established connection with the satellite.

Accordingly, FIGS. 1-5 illustrate example systems and techniques for facilitating adaptation of the operations of software applications of a UE to the characteristics of one or more satellites providing data services to the UE. In at least one embodiment, one or more satellite carriers provide current satellite ephemeris information to a server (e.g., as part of a cloud-based service). The server receives and processes this information and stores the resulting processed satellite ephemeris information in a database or other datastore. As updated satellite ephemeris information is provided by the satellite carriers, the server updates the datastore accordingly. The satellite ephemeris information provided by the satellite carriers can include positional information, such as current velocity (speed and direction) and current altitude. It further can include operational status information, such as identification of the one or more beams currently active at the satellite, and for each active beam, the beam aperture, angle or direction, transmit power, and the like. The UE, in turn, implements an application programming interface (API) or other software interface at the operating system (OS) of the UE to obtain relevant satellite ephemeris information from the server and process the obtained satellite ephemeris information to control the operation of one or more software applications of the UE that rely on the data services provided by a satellite.

To this end, in some embodiments the API is configured to generate a request for satellite ephemeris information in response to a trigger, which may be a periodic or scheduled trigger, a trigger initiated by a software application requesting the information, and the like. The UE transmits the request to the server via a wireless cellular connection with a base station connected to the server. In response to receiving the request, the server accesses the requested satellite ephemeris information and provides the information for transmission back to the UE. The API receives the supplied satellite ephemeris information and calculates one or more satellite parameters for one or more satellites from this information. These satellite parameters can include latency or throughput estimations, beam coverage maps, and the like. The API then provides one or both of the calculated satellite parameters or some or all of the satellite ephemeris information to the one or more software applications, which use this supplied information to adjust or otherwise control their operations. For example, based on the calculated throughput and latency operations, a software application may throttle the data rate employed for a data stream supported by the corresponding satellite. As another example, an estimated amount of time in which the UE will remain in the coverage area of a satellite may cause a software application to pre-buffer certain data in anticipation of the loss of satellite coverage.

Thus, through the centralization and amalgamation of satellite ephemeris information for multiple satellites from multiple carriers at a server, the access of such information facilitated by an API or other OS-based interface, and the pre-calculation of certain satellite parameters from the accessed satellite ephemeris information at the API or other interface, individual software applications of a UE can more seamlessly adapt their operations to the current satellite communication conditions.

FIG. 1 illustrates a communications system 100 employing cloud-based satellite ephemera provisioning in accordance with some embodiments. In the depicted example, the communications system 100 includes a terrestrial wireless network 102, one or more satellite networks 104 (such as the illustrated satellite networks 104-1 and 104-2), and a cloud service 106. The terrestrial wireless network 102 includes a cellular configuration, with each cell in the network 102 serviced by a corresponding base station 108 that is connected to a core network (not shown), which in turn is connected to the cloud service 106 via one or more networks, such as the Internet. Alternatively, the cloud service 106 is implemented in the core network or otherwise is a component of the terrestrial wireless network. The base station 108 supports one or more cellular radio access technologies (RATs), such as a 4G LTE RAT or a 5G NR RAT, in which case the base station 108 is often identified as an enhanced NodeB (eNB) or Next Generation NodeB (gNB), respectively. The base station 108 is configured to conduct wireless communications with one or more UEs within its coverage area, including UE 110, using a corresponding RAT.

Each satellite network 104 is managed by a corresponding satellite carrier and includes one or more telecommunication satellites in orbit around the Earth and in wireless communication with one or more gateway Earth stations, or "gateway" for simplicity (and also commonly referred to as a ground station, teleport, or hub). To illustrate, the satellite network 104-1 includes a telecommunications satellite 112 in wireless communication with a gateway 114. Each gateway, in turn, is connected to one or more networks via various wired or wireless connections.

The cloud service 106 comprises at least one server 116 and associated support equipment. The server 116 is connected to one or more gateways or other interfacing components of each satellite network 104 via one or more wired or wireless networks, and further is connected to the base station 108 (or core network) of the terrestrial wireless network 102 via one or more wired or wireless networks (or, as noted above, the server 116 may be part of the core network of the terrestrial wireless network 102). As described in greater detail herein, the cloud service 106, via the server 116, operates to receive and process satellite ephemeris information from one or more satellite networks 104, and store the resulting current satellite ephemeris information for subsequent distribution to requesting UEs of the terrestrial wireless network 102.

The UE 110 comprises any of a variety of electronic devices configured to conduct wireless signaling with various terrestrial radio access networks (RANs) via corresponding base stations, including the illustrated terrestrial wireless network 102 and its base station 108, as well as with one or more satellite RANs via one or more corresponding telecommunications satellites, such as the telecommunication satellite 112 of the satellite network 104-1. Examples of the UE 110 thus can include smartphones, smartwatches or other wearable devices, notebook and tablet computers, wireless-enabled vehicles, and the like. To establish and maintain a wireless connection with the base station 108, the UE 110 can utilize any of a variety of well-known techniques suitable for the corresponding terrestrial RAT employed. These techniques are facilitated by the typically stationary configuration of the base station 108, as well as the ability of the UE 110 and the base station 108 to assess, and adapt for, the capabilities of the other due in part to the relative proximity of the two components. However, for the establishment of a satellite connection, the relative distance between a UE and a corresponding satellite, the motion of the satellite relative to the UE, the uncertainty of the particular position and other parameters of the satellite, and the lack of a mechanism to directly communicate this information to the UE often disproportionately complicates the UE's ability to establish a satellite connection and to operate in accordance with the current operational environment of the satellite.

Accordingly, to facilitate the UE's understanding of the current status of the satellite so that it may adapt the operation of its software applications that rely on the data services provided by the satellite accordingly, in at least one embodiment the cloud service 106 operates to serve amalgamated and uniformized satellite ephemeris information to these software applications of the UE 110, such as software applications 117, 118, via a satellite API 120 implemented by an operating system (OS) or other software layer of the UE 110. As a general operational overview, a gateway 114 or other components of each satellite network 104 supplies satellite ephemeris information 122, such as satellite ephemeris information 122-1 and satellite ephemeris information 122-2, to the cloud service 106 on a periodic basis or in response to some other trigger. The server 116 of the cloud service 106 receives this information, filters this information, formats the information to comply with a standardized format, and then updates a database or other datastore (e.g., ephemera database 212 of FIG. 2) with the resulting processed information such that the database stores the most current satellite ephemeris information for the satellites 112 of the supported satellite networks 104. The supplied satellite ephemeris information 122 can include certain parameters regarding the physical status of the satellite 112, such as its current altitude 125 and its current velocity 127. The satellite ephemeris information 122 further can include information regarding its current radio frequency (RF) operational parameters, such as identifiers of the one or more beams 130 that are currently active at the satellite 112, and for each identified active beam 130, one or more of a beam type (e.g., wide beam or spot beam), an aperture 132 of the active beam 130, and a direction 134 (or angle) of the active beam 130. Further, the satellite ephemeris information 122 can include an indicator of the satellite's current transmit power, such as in the form of an Effective Radiated Power (ERP) or an Effective Isotropic Radiated Power (EIRP) parameter, either for all active beams 130 or on a beam-by-beam basis.

In response to a specified trigger, such as the lapse of a periodic timer or a request for information from one of the software applications 117, 118, the satellite API 120 transmits a request 126 for satellite ephemeris information to the server 116 via a wireless data connection between the UE 110 and the base station 108 and then as a wired or wireless connection between the BS 108 and the cloud service 106. To illustrate, the request 126 may be formatted as a Hypertext Transfer Protocol (HTTP) GET request, a Representational State Transfer (REST) request, other client-server protocols, and the like. In at least one embodiment, the request 126 includes an identifier of the particular satellites or particular satellite carrier for which the satellite ephemeris information should be provided. For example, the UE 110 may utilize a subscriber identity module (SIM) card associated with a corresponding satellite carrier, and the satellite carrier identifier in the SIM card may be supplied as part of the request 126. The request 126, in some embodiments, further can include applicable UE capabilities, such as frequency bands supported by the UE 110. The server 116 receives the request 126, accesses the current satellite ephemeris information requested by the request 126 from the database, and transmits a reply 128 containing the requested satellite ephemeris information to the UE 110 via the base station 108, such as in the form of an HTTP response or REST response. The API 120 receives the reply 128 and extracts the satellite ephemeris information.

In at least one embodiment, to facilitate broad interoperability and to mitigate duplicate efforts on the part of multiple software applications, the satellite API 120 is configured to interpret the satellite ephemeris information on behalf of the software applications so as to calculate one or more satellite parameters from the satellite ephemeris information, and then provide these one or more satellite parameters to the software applications 117, 118 in addition to, or instead of, the satellite ephemeris information obtained from the reply 128. For example, rather than have each software application perform its own separate calculation to estimate throughput and latency of the wireless connection between the UE 110 and the satellite 112 based on the satellite ephemeris information, the satellite API 120 can perform these calculations a single time and then provide the same resulting throughput and latency estimations to each of the software applications 117, 118. Moreover, the satellite API 120 may be able to determine certain current satellite parameters further using current UE parameter information to which the software application may not have access. As an example, in some embodiments the satellite API 120 utilizes one or more of the parameters representing the altitude 125 and the velocity 127 of the satellite 112, and the beam angle 134, and the beam aperture 132 of an active beam 130 of the satellite 112, as provided in the satellite ephemeris information of the reply 128 to calculate a current beam coverage map representing the effective geographical coverage area of the active beam 130. The satellite API 120 then may utilize a current position of the UE 110 as provided via, for example, a Global Positioning System (GPS) sensor, to determine the current location of the UE 110 within the current beam coverage map, and then to further estimate the amount of time the UE 110 will remain within the current beam coverage map based on the position of the UE 110, the velocity of the UE 110, and the velocity 127 of the satellite 112. An indicator of the estimated time remaining in current coverage then may be provided to one or both of the software applications 117, 118.

The software applications 117, 118 use the one or more current satellite parameters calculated by the satellite API 120, and in some instances the supplied satellite ephemeris information itself, to adapt their operations to the current satellite link environment represented in these supplied parameters. To illustrate, one or both of a latency estimation or a throughput estimation may be used by the software application 117 to throttle the data rate of a data stream being uploaded or downloaded by the software application 117 via the satellite data connection, or used by the software application 118 to adjust certain operating parameters, such as an encoder/decoder (codec) parameters employed by an encoder of the software application 118 used to encode upstream multimedia stream, or by an encoder of a server providing a downstream multimedia stream to the UE 110.

Figure 2:
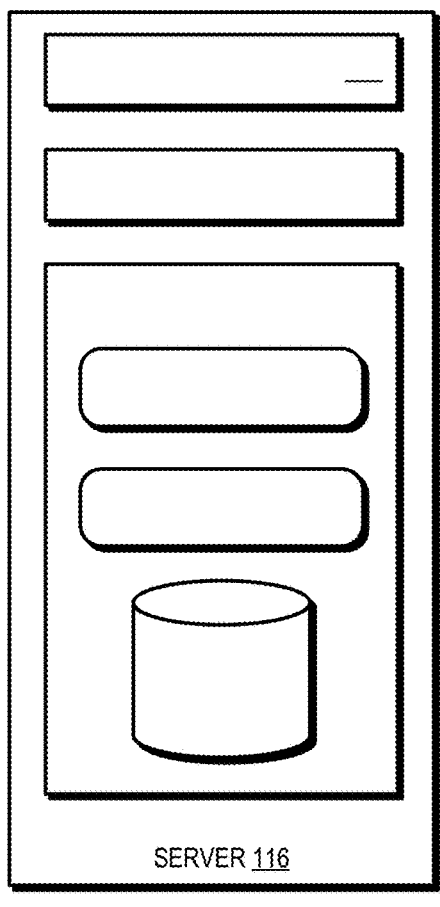
FIG. 2 is a block diagram of a server of the wireless communications system of FIG. 1 in accordance with some embodiments.

FIG. 2 illustrates an example configuration of the server 116 of the cloud service 106 of FIG. 1 in accordance with some embodiments. As depicted, the server 116 includes one or more network interfaces 202, one or more processors 204, and one or more non-transitory computer-readable media

206. The one or more network interfaces 202 each is coupled to a corresponding network and can include wired interfaces (such as a wired Gigabit Ethernet interface), wireless interfaces (such as IEEE 802.11-based wireless interfaces), and the like. The one or more processors 204 can include, for example, one or more central processing units (CPUs), graphics processing units (GPUs), an artificial intelligence (AI) accelerator or other application-specific integrated circuits (ASIC), and the like. The computer-readable media 206 can include any of a variety of media used by electronic devices to store data and/or executable instructions, such as random access memory (RAM), read-only memory (ROM), caches, Flash memory, solid-state drive (SSD) or other mass-storage devices, and the like. For ease of illustration and brevity, the computer-readable media 206 is referred to herein as "memory 206" in view of frequent use of system memory or other memory to store data and instructions for execution by the processor 204, but it will be understood that reference to "memory 206" shall apply equally to other types of storage media unless otherwise noted.

The one or more memories 206 of the server 116 are used to store one or more sets of executable software instructions and associated data that manipulate the one or more processors 204 and other components of the server 116 to perform the various functions described herein and attributed to the server 116. The sets of executable software instructions include, for example, an operating system (OS) and various drivers (not shown), various software applications (not shown), an ephemera aggregator 208 and an API manager 210. Data stored in the one or more memories 206 includes an ephemera database 212, which although identified as a "database" herein for ease of reference, can include any of a variety of data structures or other datastores, or combinations thereof. The ephemera database 212 stores satellite ephemeris information for the one or more satellites of one or more satellite networks, such as the satellite 112 of satellite network 104-1 (FIG. 1). The ephemera aggregator 208 operates to receive, for each satellite supported by the server 116, current satellite ephemeris information from a gateway or other component of the satellite network that operates the satellite. This information can be supplied on a periodic basis or in accordance with a specified schedule, in response to a query from the ephemera aggregator 208 to the corresponding satellite carrier, as part of an information push from the satellite carrier, and the like. The ephemera aggregator 208 then updates the corresponding satellite ephemeris information for the corresponding satellite in the ephemera database 212 to reflect the current conditions of the corresponding satellite.

The format of the satellite ephemeris information supplied by a satellite carrier may not be consistent with the format of satellite ephemeris information expected by the satellite APIs 120 of the UEs 110 supported by the server. Further, in some embodiments, the server 116 supports multiple satellite networks and thus multiple satellite carriers, each of which may format its supplied satellite ephemeris information in a different format. Accordingly, in at least one embodiment, the ephemera aggregator 208 processes the incoming satellite ephemeris information to be compatible with the expected format as supplied to a satellite API 120. This can include filtering the incoming information, such as by removing parameters not tracked by the server 116, by removing duplicate or redundant information, and the like. This processing further can include reformatting of the information, such as by performing unit conversion (e.g., converting miles per hour to meters per second), by reorganizing the data values, by harmonizing numbering formats, and the like.

The API manager 210 operates to process requests (e.g., request 126) for satellite ephemeris information received from the satellite APIs 120 of the UEs 110 in the system 100, to query or otherwise access the ephemera database 212 based on the received request, and to supply the requested and accessed satellite ephemeris information to the satellite APIs 120 as corresponding replies (e.g., reply 128) via the base station 108 and the wireless links connecting the base station 108 and the UEs 110. To illustrate, in implementations in which the satellite API 120 presents its requests 126 as HTTP requests, the API manager 210 can be implemented as an HTTP server to process such HTTP requests.

Figure 3:
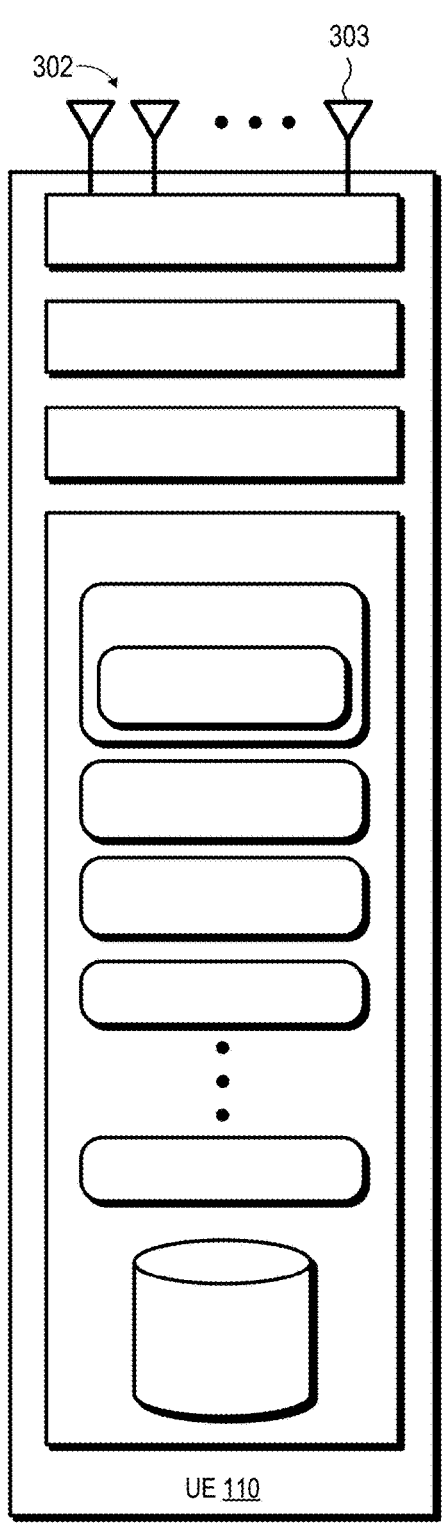
FIG. 3 is a block diagram of a UE of the wireless communications system of FIG. 1 in accordance with some embodiments.

FIG. 3 illustrates an example configuration of the UE 110 of the system 100 of FIG. 1 in accordance with some embodiments. In the depicted configuration, the UE 110 includes, for each RAT, one or more antenna arrays 302, each having one or more antennas 303, a radio frequency (RF) interface 304, and a corresponding modem 306. For example, for terrestrial wireless communications, the UE 110 may include a set of one or more antenna arrays 302, one or more RF interfaces 304, and one or more modems 306 to support 4G LTE or 5G NR signaling with the base station 108, this componentry collectively referred to as a "cellular interface". For satellite communications, the UE 110 may include another set of one or more antenna arrays, one or more RF interfaces 304, and one or more modems to support wireless signaling with the satellites 112 of a corresponding satellite network 104, with this componentry collectively referred to as a "satellite interface".

The UE 110 further includes one or more processors 308 and one or more non-transitory computer-readable media 310. The one or more processors 308 can include, for example, one or more CPUs, GPUs, AI accelerators or other ASICs, and the like. The computer-readable media 310 can include any of a variety of media used by electronic devices to store data and/or executable instructions, such as RAM, ROM, caches, Flash memory, SSD or other mass-storage devices, and the like. For ease of illustration and brevity, the computer-readable media 310 is referred to herein as "memory 310", but it will be understood that reference to "memory 310" shall apply equally to other types of storage media unless otherwise noted.

The one or more memories 310 of the UE 110 are used to store one or more software applications (e.g., software applications 117, 118 of FIG. 1) in the form of sets of executable software instructions and associated data that manipulate the one or more processors 308, modems 306, RF interfaces 304, and other components of the UE 110 to perform the various functions described herein and attributed to the UE 110. The software includes, for example, an OS 312 and associated drivers (not shown), as well as various software applications including, for example, a telephony platform 314 that manages the telephony and data connections provided by the terrestrial wireless network 102 and the satellite networks 104, a set of software applications and API that facilitates functionality across devices, such as a Google Mobility Services (GMS) core 316, and one or more user software applications, such as user software applications 318 and 320. The user software applications 318 and 320 utilize the data services provided by the terrestrial wireless network 102 and the satellite networks 104. Examples of such applications include navigation and mapping applications, video streaming applications, packetized-data telephony applications, video conference applications, gaming applications, web-browsing applications, and the like. The stored sets of executable instructions further include the satellite API 120. In the illustrated embodiment, the satellite API 120 is implemented as part of the OS 312 or its associated services. However, the satellite API 120 may be implemented at any of a variety of software components of the UE 110, such as part of the GMS core 316 or the telephony platform 314.

During operation, some software applications of the UE 110 may make use of various information regarding the state or status of the UE 110, referred to herein as "UE local information," which is stored in one or more datastores or other data structures in the one or more memories 310. These data structures and the information contained therein are collectively referred to herein as "UE local information 322." Examples of the UE local information 322 include positional information for the UE 110 as obtained from, for example, a GPS sensor or a visual odometry system, information regarding the RF capabilities of the UE 110, such as antenna gain or noise figure, information remaining battery power, current power mode, and the like.

Figure 4:
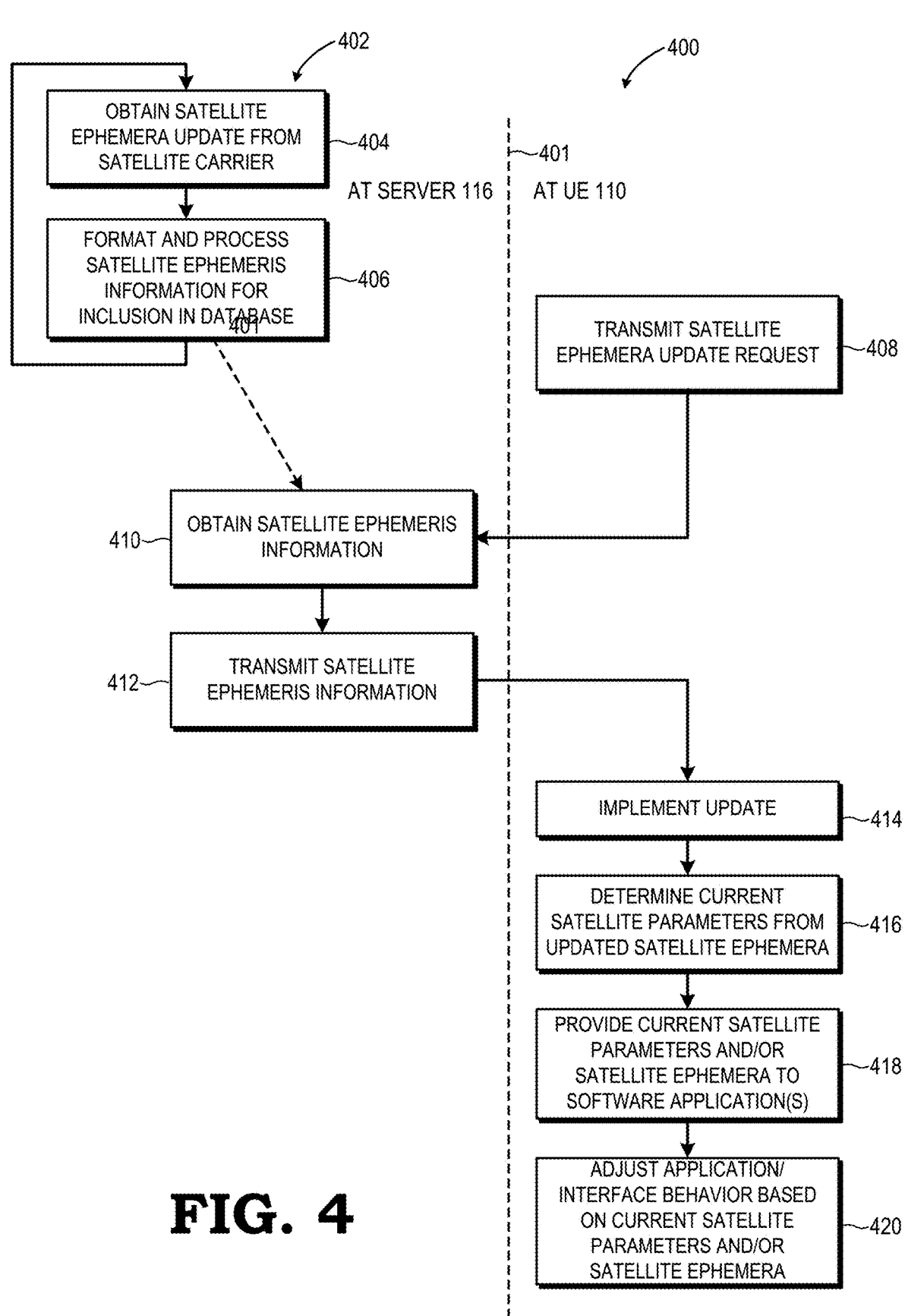
FIG. 4 is a flow diagram illustrating a method for providing satellite ephemera via an API in accordance with some embodiments.

FIG. 4 illustrates an example method 400 for utilizing the satellite API 120 to provide for control or adaptation of various software services at the UE 110 based on obtained satellite ephemeris information in accordance with some embodiments. Note that for the purposes of the illustrated example, a line 401 serves to indicate which of the server 116 or the UE 110 performs the described processes, with the processes described with reference to blocks located to the left of the line 401 being performed by the server 116, while the processes described with reference to blocks located to the right of the line 401 are performed by the UE 110.

The method 400 includes an iterative subprocess 402 for maintaining up-to-date data in the ephemera database 212 of the server 116. At block 404 of this subprocess, the server 116 obtains original or updated satellite ephemeris information 122 from one or more of the satellite networks 104. As noted above, the ephemera aggregator 208 of the server 116 can poll or query the satellite carriers for this information on a periodic or scheduled basis, or the satellite carriers can push this information to the server 116 on their own schedules, and the like. For each block of satellite ephemeris information 122 received from a satellite carrier, at block 406 the ephemera aggregator 208 processes the information for inclusion in the ephemera database 212, which may include various processes such as unit conversion, converting to a uniform numerical representation, filtering out duplicative or irrelevant data, and the like. The ephemera aggregator 208 then updates the ephemera database 212 with the resulting data. An iteration of the subprocess 402 then repeats for each instance of received satellite ephemeris information from a satellite carrier for one or more satellites.

The main process of supplying satellite ephemera to the satellite API 120 of the UE 110 for use in controlling the operation of the UE 110 begins at block 408 with the UE 110 generating a request (e.g., request 126, FIG. 1) for a satellite ephemera update and wirelessly transmitting the request to the base station 108 for forwarding to the server 116. The trigger for the generation of the request can include, for example, a periodic or scheduled trigger, a request from one or more of the software applications of the UE 110, and the like. The request may specify the particular satellite ephemeris information sought based on any of a variety of considerations, such as by identifying the satellite networks 104 or satellite carriers intended to support the UE 110, by providing a SIM identifier or other identifier of the UE 110, by identifying a particular satellite or set of satellites, by providing a current location identifier for the UE 110, and the like. As noted above, the request may take the form of any of a variety of request formats often employed by APIs that interact with remote networked data sources, such as in the form of a REST request or an HTTP GET request. In some embodiments, it is the satellite API 120 that initiates the request, whereas in other embodiments it can be a system application or user application of the UE 110 that triggers the request generation.

At block 410, the API manager 210 of the server 116 receives the request from the satellite API 120 of the UE 110 and accesses the ephemera database 212 to obtain current satellite ephemeris information to satisfy the request. The particular information obtained may be based on the satellite carrier or satellite network identified in the request 126, the particular UE 110 or UE location identified in the request, a particular set of one or more satellites identified in the request 126, and the like. At block 412, the API manager 210 generates a reply (e.g., reply 128) that contains the accessed satellite ephemeris information and provides the reply to the network interface 202 for transmission to the base station 108, which in turn wirelessly transmits the reply to the UE 110.

At block 414, the UE 110 receives the reply from the server 116 and the satellite API 120 processes the reply to extract the satellite ephemeris information contained therein and then updates its local datastore of satellite ephemeris information to reflect the updated data contained in the reply. With the current and updated satellite ephemera, at block 416 the satellite API 120 calculates or determines one or more current satellite parameters for a specified satellite or set of satellites. The one or more specified satellites may be, for example, one or more satellites that the UE 110 currently has an established wireless connection, one or more satellites that the UE 110 is attempting to establish a wireless connection or anticipates will soon attempt to establish a wireless connection, and the like. The one or more current satellite parameters can include any of a variety of data or information that represents the current state of a corresponding satellite or an indicator of a parameter of its resulting operation. For example, the current satellite parameters for a specified satellite can include one or both of an estimation of a latency or a throughput of the satellite with respect to the UE 110, an estimated current coverage area, and the like. As will be described in the examples of FIG. 5 below, the satellite API 120 further may calculate the one or more current satellite parameters based on the UE local information 322, such as based on the current location or current antenna gain of the UE 110.

At block 418, the satellite API 120 provides one or both of some or all of the calculated current satellite parameters or some or all of the current satellite ephemeris information for one or more satellites of interest to one or more software applications of the UE 110. The particular information provided by the satellite API 120 may vary between the software applications. For example, in some embodiments the satellite API 120 may provide satellite information solely to the software application that requested that particular information (that is, solely to the software application that made the call to the satellite API 120). In other embodiments, an update to the satellite ephemeris information or an update to one or more of the calculated satellite parameters may trigger the satellite API 120 to push some or all of the updated information to one or more software applications regardless of which software application initiated the request.

At block 420, a software application receiving the updated satellite parameters and/or updated satellite ephemeris information adjusts or otherwise controls one or more aspects of its operation based on this received information. Generally, the control/modification of the operations of a software application pertains to that software application's use of a wireless connection established, or attempted to be established, with the satellite represented in the updated information. This can include modifying software operations so as to adjust data usage, modifying operations in establishing, tearing down, or handing over satellite connections, and the like.

Figure 5:
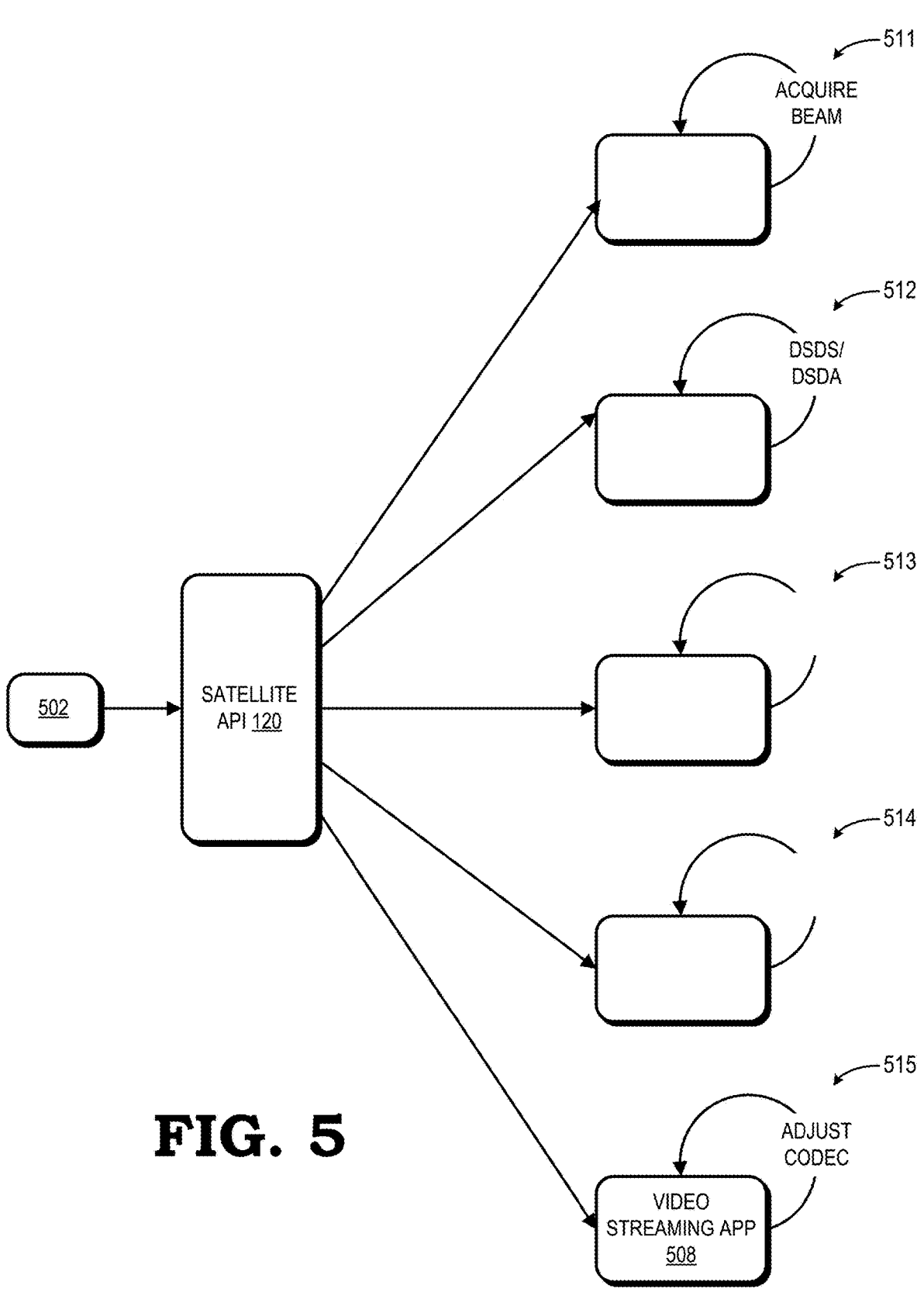
FIG. 5 is a diagram illustrating various example operations of a UE utilizing a satellite API in accordance with some embodiments.

FIG. 5 illustrates a number of non-limiting examples of control or modification of the operation of a software application of the UE 110 in response to satellite information provided by the software API 120 as represented by block 420 of the method 400 of FIG. 4. For the following examples, the server 116 provides updated satellite ephemeris information 520 used by the satellite API 120 to generate the corresponding satellite parameters and satellite ephemera used in these examples.

As illustrated by example 511, the satellite API 120 extracts the beam identifier of a beam (e.g., beam 130) identified in the satellite ephemeris information 520 and provides this beam identifier to a satellite interface (IF) 502 of the UE 110, wherein the satellite IF 502 represents the software of the modem 306 and the telephony platform 314 used to control the antenna array 302 for satellite RF communications. The satellite IF 502 in turn uses this beam identifier to rapidly acquire the identified beam (that is, quickly configure the antenna array 302 to establish a wireless link with the satellite via the identified beam).

As illustrated by example 512, the satellite ephemeris information 520 may contain satellite ephemeris information for satellites from multiple satellite carriers, and thus the satellite API 120 can extract the active beam information for different satellites from different satellite carriers and provide this information to the satellite IF 502, which can use this information to support multiple concurrent data connections with different carriers in a manner analogous to the Dual Sim/Dual Active (DSDA) or Dual Sim/Dual Standby (DSDS) processes found in terrestrial cellular systems.

Example 513 illustrates the calculation of a current coverage area of a serving satellite to control the operation of a map software application 504. To illustrate, the satellite ephemeris information 520 may contain the current altitude 125 and velocity 127 of the satellite 112 current providing data service to the UE 110, as well as an indicator of the beam aperture 132, beam angle 134, and EIRP of the active beam 130 acquired by the UE 110. The satellite API 120 can use this information to calculate the current effective coverage area of the acquired active beam 130 (that is, the current effective "footprint" of the active beam 130 of the satellite). The satellite API 120 then can use the current position, current velocity, and current antenna gain of the UE 110 to estimate the amount of time the UE 110 will remain in the effective coverage area of the satellite 112 before the UE 110 is handed over to a different satellite. The satellite API 120 can provide a representation of the estimated time remaining to the map software application 504, which uses this information in deciding whether to trigger pre-buffering of map information at the UE 110 prior to an anticipated handover so that the mapping/navigation service provided by the map software application 504 is not impacted by the handover.

In example 514, the satellite API 120 uses altitude, velocity, active beam identification, and transmit power indicators in the satellite ephemeris information 520 in conjunction with location information and antenna gain and noise figure information in the UE local information 322 to calculate a current throughput estimation and latency estimation for the data connection between the UE 110 and a satellite and provides these estimations to a video conference application 506 of the UE 110. The video conference application 506 then uses one or both of the latency estimation or throughput estimation to selectively throttle the data rate of one or both of its outgoing video stream or incoming video stream for a video conference being conducted via a data link between the UE 110 and the corresponding satellite. For example, throughput can be estimated by dividing the volume of delivered data by the amount of time used to transmit/receive that volume of data. As for latency, this metric can be estimated based on analysis of time stamps, queuing times for packets, the distance between the UE 110 and the corresponding satellite, etc.

Example 515 similarly relies on the satellite API 120 calculating latency and throughput estimations, which are provided to a video streaming application 508 of the UE 110. The video streaming application 508 can use these estimates to adapt one or both of an incoming video stream from the corresponding satellite or an outgoing video stream being transmitted to the corresponding satellite by adjusting one or more codec parameters to better match the latency and throughput estimations. This can include the video streaming application 508 adjusting its own encoding parameters for an outgoing video stream or requesting that a remote server adjust its encoding parameters for an incoming video stream.

In some embodiments, certain aspects of the techniques described above may be implemented by one or more processors of a processing system executing software. The software comprises one or more sets of executable instructions stored or otherwise tangibly embodied on a non-transitory computer-readable storage medium. The software can include the instructions and certain data that, when executed by the one or more processors, manipulate the one or more processors to perform one or more aspects of the techniques described above. The non-transitory computer-readable storage medium can include, for example, a magnetic or optical disk storage device, solid-state storage devices such as Flash memory, a cache, random access memory (RAM) or other non-volatile memory device or devices, and the like. The executable instructions stored on the non-transitory computer-readable storage medium may be in source code, assembly language code, object code, or other instruction format that is interpreted or otherwise executable by one or more processors.

A computer-readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer-readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed is not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method at a user equipment, the method comprising:
   wirelessly receiving satellite ephemeris information for a set of one or more satellites from a server;
   calculating one or more satellite parameters for at least one satellite of the set based on the satellite ephemeris information; and
   controlling, based on the one or more satellite parameters, operation of a software application of the user equipment that utilizes a packetized data service provided to the user equipment via the at least one satellite.

2. The method of claim 1, wherein:
   calculating one or more satellite parameters comprises calculating one or more satellite parameters at an application programming interface (API) of the user equipment; and
   controlling operation of a software application comprises:
       receiving, at the API, a request for satellite ephemeris information from the software application;
       providing, by the API, a representation of the one or more satellite parameters to the software application in response to receiving the request; and
       adjusting, at the software application, an operation of the software application based on the representation of the one or more satellite parameters.

3. The method of claim 1, wherein the satellite ephemeris information includes, for a satellite of the set, at least one of: a velocity of the satellite, an altitude of the satellite, a transmit power indicator of the satellite, an indicator of one or more beams active at the satellite, an indicator of an aperture of an active beam of the satellite, and an indicator of an angle of an active beam of the satellite.

4. The method of claim 1, wherein calculating one or more satellite parameters comprises calculating at least one of a throughput estimation or a latency estimation of a wireless connection available between the user equipment and a satellite based on the satellite ephemeris information.

5. The method of claim 4, wherein controlling operation of a software application comprises at least one of:

throttling a data rate of a data stream of the software application based on at least one of the throughput estimation or the latency estimation; and adjusting a codec parameter of the software application based on at least one of the throughput estimation or the latency estimation.

6. The method of claim 4, wherein calculating at least one of a throughput estimation or a latency estimation comprises calculating at least one of the throughput estimation or the latency estimation further based on one or more current operational parameters of the user equipment.

7. The method of claim 6, wherein the one or more current operational parameters of the user equipment comprise at least one of a current location, a current velocity, a satellite antenna gain, and a noise figure.

8. The method of claim 1, wherein calculating one or more satellite parameters comprises calculating a current beam coverage map of a satellite based on the satellite ephemeris information.

9. The method of claim 8, wherein calculating one or more satellite parameters further comprises calculating an estimate of an amount of time the user equipment will remain within a coverage area of the satellite based on the current beam coverage map and a current location of the user equipment.

10. The method of claim 9, wherein controlling operation of a software application comprises pre-buffering data based on the estimated amount of time the user equipment will remain within a coverage area of the satellite.

11. The method of claim 1, wherein controlling operation of a software application comprises configuring a satellite interface of the user equipment to support dual concurrent connections with two satellites based on the one or more satellite parameters.

12. A method at a server, comprising:

receiving, from each of a plurality of satellite carriers, first satellite ephemeris information for at least one satellite of a corresponding satellite carrier;

storing the first satellite ephemeris information at a datastore of the server; and in response to receipt of a request from a user equipment for satellite ephemeris information associated with a packetized data service provided via at least one satellite, accessing second satellite ephemeris information for at least one satellite from the datastore and wirelessly transmitting the accessed second satellite ephemeris information to the user equipment.

13. The method of claim 12, further comprising:

receiving, from each of the plurality of satellite carriers, third satellite ephemeris information for at least one satellite of the corresponding satellite carrier subsequent to receiving the first satellite ephemeris information; and storing the third satellite ephemeris information as updated satellite ephemeris information at the datastore.

14. The method of claim 12, wherein the first satellite ephemeris information includes at least one of: a velocity of a satellite, an altitude of a satellite, a transmit power indicator of a satellite, an indicator of one or more beams active at a satellite, an indicator of an aperture of an active beam of a satellite, and an indicator of an angle of an active beam of a satellite.

15. A server configured to perform the method of claim 12.

16. A user equipment comprising:

a cellular interface to wirelessly receive satellite ephemeris information for a set of one or more satellites from a server;

a satellite interface to wirelessly communicate with one or more satellites;

a processor coupled to the cellular interface and the satellite interface; and a memory coupled to the processor, the memory storing executable instructions that are configured to manipulate the processor to:

calculate one or more satellite parameters for at least one satellite of the set based on the satellite ephemeris information; and control, based on the one or more satellite parameters, operation of a software application of the user equipment that utilizes a packetized data service provided to the user equipment via the at least one satellite.

17. The user equipment of claim 16, wherein:

the executable instructions configured to manipulate the processor to calculate one or more satellite parameters comprise executable instructions configured to manipulate the processor to calculate one or more satellite parameters at an application programming interface (API) of the user equipment; and the executable instructions configured to manipulate the processor to control operation of a software application comprise executable instructions configured to manipulate the processor to:

receive, at the API, a request for satellite ephemeris information from the software application;

provide, by the API, a representation of the one or more satellite parameters to the software application in response to receiving the request; and adjust, at the software application, an operation of the software application based on the representation of the one or more satellite parameters.

18. The user equipment of claim 16, wherein the executable instructions configured to manipulate the processor to calculate one or more satellite parameters comprises executable instructions configured to manipulate the processor to calculate at least one of a throughput estimation or a latency estimation of a wireless connection available between the user equipment and a satellite based on the satellite ephemeris information.

19. The user equipment of claim 18, wherein the executable instructions configured to manipulate the processor to control operation of a software application comprises executable instructions configured to manipulate the processor to at least one of:

throttle a data rate of a data stream of the software application based on at least one of the throughput estimation or the latency estimation; and adjust a codec parameter of the software application based on at least one of the throughput estimation or the latency estimation.

20. The user equipment of claim 18, wherein the at least one of a throughput estimation or a latency estimation is calculated further based on one or more current operational parameters of the user equipment.

21. The user equipment of claim 16, wherein the executable instructions configured to manipulate the processor to calculate one or more satellite parameters comprises executable instructions configured to manipulate the processor to:

calculate a current beam coverage map of a satellite based on the satellite ephemeris information; and calculate an estimate of an amount of time the user equipment will remain within a coverage area of the satellite based on the current beam coverage map and a current location of the user equipment.

22. The user equipment of claim 21, wherein the executable instructions configured to manipulate the processor to control operation of a software application comprises executable instructions configured to manipulate the processor to pre-buffer data based on the estimated amount of time the user equipment will remain within a coverage area of the satellite.

23. The user equipment of claim 16, wherein the executable instructions configured to manipulate the processor to control operation of a software application comprises executable instructions configured to manipulate the processor to configure a satellite interface of the user equipment to support dual concurrent connections with two satellites based on the one or more satellite parameters.

* * * * *